(12) United States Patent
Bryan

(10) Patent No.: US 6,917,511 B1
(45) Date of Patent: Jul. 12, 2005

(54) REACTIVE DEPOSITION FOR THE FORMATION OF CHIP CAPACITORS

(75) Inventor: Michael A. Bryan, Oakland, CA (US)

(73) Assignee: NeoPhotonics Corporation, Fremont, CA (US)

( * ) Notice: Subject to any disclaimer, the term of this patent is extended or adjusted under 35 U.S.C. 154(b) by 0 days.

(21) Appl. No.: 10/219,019

(22) Filed: Aug. 14, 2002

Related U.S. Application Data

(60) Provisional application No. 60/312,234, filed on Aug. 14, 2001.

(51) Int. Cl.[7] ............................................. H01G 4/06
(52) U.S. Cl. .................... 361/311; 361/321.2; 29/25.41
(58) Field of Search ........................ 361/303, 311–313, 361/321.2–321.5, 329; 29/25.41, 25.42; 257/295, 296

(56) References Cited

U.S. PATENT DOCUMENTS

| | | |
|---|---|---|
| 3,806,570 A | 4/1974 | Flamenbaum et al. |
| 3,883,336 A | 5/1975 | Randall |
| 3,923,484 A | 12/1975 | Randall |
| 3,932,162 A | 1/1976 | Blankenship |

(Continued)

FOREIGN PATENT DOCUMENTS

| | | |
|---|---|---|
| WO | WO 99/23189 | 5/1999 |
| WO | WO 99/61244 | 12/1999 |
| WO | WO 01/07155 | 2/2001 |
| WO | WO 02/32588 | 4/2002 |

OTHER PUBLICATIONS

Rabii et al., "Recent advances in the fabrication of hollow glass waveguides", SPIE vol. 3262, pp. 103–107, 1998.
Liang et al., "Laser synthesize silicon–based and ferro–based nano powders", SPIE vol. 3862, pp. 17–21, 1999.
Barbarossa et al., "Effect of temperature gradient on sintering kinetics of doped silica waveguides by flame hydrolysis deposition", SPIE vol. 1794 Integrated Optical Circuits II, pp. 191–197, 1992.

(Continued)

*Primary Examiner*—Anthony Dinkins
(74) *Attorney, Agent, or Firm*—Patterson, Thuente, Skaar & Christensen, P.A.; Peter S. Dardi

(57) ABSTRACT

Methods for the production of ceramic chip capacitors include the deposition of at least two layers of electrical conductor and at least one layer of a dielectric between electrical conducting layers. The compositions in the dielectric layer are deposited from a flow in which flowing reactants react to form particles in a reaction driven by light at a light reaction zone. In some embodiments, a plurality of dielectric layers is deposited. Suitable dielectric materials include barium titanate. A collection of barium titanate particles can be formed in the coating process having an average diameter less than about 90 nanometers. Thus, ceramic chip capacitors can be formed with barium titanate particles having an average diameter less than about 90 nanometers.

37 Claims, 8 Drawing Sheets

U.S. PATENT DOCUMENTS

| | | |
|---|---|---|
| 3,934,061 A | 1/1976 | Keck et al. |
| 4,038,370 A | 7/1977 | Tokimoto et al. |
| 4,113,844 A | 9/1978 | Tokimoto et al. |
| 4,735,677 A | 4/1988 | Kawachi et al. |
| 4,814,289 A | 3/1989 | Baeuerle |
| 4,868,005 A | 9/1989 | Ehrlich et al. |
| 5,060,595 A | 10/1991 | Ziv et al. |
| 5,108,952 A | 4/1992 | Matsuhashi |
| 5,276,012 A | 1/1994 | Ushida et al. |
| 5,385,594 A | 1/1995 | Kanamori et al. |
| 5,453,908 A * | 9/1995 | Tsu et al. ............ 361/321.5 |
| 5,551,966 A | 9/1996 | Hirose et al. |
| 5,556,442 A | 9/1996 | Kanamori et al. |
| 5,617,290 A * | 4/1997 | Kulwicki et al. ........ 361/321.4 |
| 5,622,750 A | 4/1997 | Kilian et al. |
| 5,731,220 A * | 3/1998 | Tsu et al. ............ 438/782 |
| 5,862,034 A | 1/1999 | Sato et al. |
| 5,863,604 A | 1/1999 | Hunt et al. |
| 5,874,134 A | 2/1999 | Rao et al. |
| 5,885,904 A | 3/1999 | Mehta et al. |
| 5,958,348 A | 9/1999 | Bi et al. |
| 5,997,956 A | 12/1999 | Hunt et al. |
| 6,011,981 A | 1/2000 | Alvarez et al. |
| 6,032,871 A | 3/2000 | Börner et al. |
| 6,074,888 A | 6/2000 | Tran et al. |
| 6,097,144 A | 8/2000 | Lehman |
| 6,193,936 B1 | 2/2001 | Gardner et al. |
| 6,226,172 B1 | 5/2001 | Sato et al. |
| 6,254,928 B1 | 7/2001 | Doan |
| 6,280,802 B1 | 8/2001 | Akedo et al. |
| 6,326,116 B2 | 12/2001 | Yuasa et al. |
| 6,331,325 B1 * | 12/2001 | Kulwicki et al. ............ 427/79 |

OTHER PUBLICATIONS

Lebedev et al., "Laser distillation–deposition synthesis of silica glasses with variable concentrations of oxygen deficient centers", SPIE vol. 2498, pp. 65–71, 1995.

Barbarossa et al., "High–silica cascaded three–waveguide couplers for wideband filtering by Flam Hydrolysis on Si", SPIE vol. 1583 Integrated Optical Circuits, pp. 122–128, 1991.

Barbarossa et al., "Optical damage threshold of $P_2O_5$ and $GeO_2$–$P_2O_5$–doped silica waveguides", SPIE vol. 1794 Integrated Optical Circuits II, pp. 185–190, 1992.

Barbarossa et al., "High–silica low–loss three waveguide couplers on Si by Flame Hydrolysis Deposition", SPIE vol. 1513 Glasses for Optoelectronics II, pp. 37–43, 1991.

Maxwell, "Photosensitivity & rare–earth doping in flame hydrolysis deposited planar silica waveguides", SPIE vol. 2695, pp. 16–29, 1996.

Sun et al., "Building passive components with silica waveguides", SPIE vol. 3795, pp. 313–319, 1999.

Center for Nano Particle Control, Website Mansoo CHOI, Associate Professor of Mechanized Engineering, Seoul National University, Jun. 2000.

* cited by examiner

REACTIVE DEPOSITION FOR THE FORMATION OF CHIP CAPACITORS

CROSSREFERENCE TO RELATED APPLICATIONS

This application claims priority to copending U.S. Provisional Patent Application No. 60/312,234, filed Aug. 14, 2001, to Bryan, entitled "Reative Deposition For The Formation Of Chip Capacitors," incorporated herein by reference.

FIELD OF THE INVENTION

The invention relates to chip capacitors with dielectric compositions separating electrodes in a multi-layer construction. The invention further relates to reactive deposition of dielectric materials with light driving the reaction for the formation of a multi-layer capacitor.

BACKGROUND OF THE INVENTION

Small multi-layer chip capacitors are used in various electronic devices due to their high capacity, high reliability and compact size. Along with demands for continuing reductions in size and improved reliability, there has been increasing demands for price reductions and increased capacity. Conventional approaches for the production of ceramic chip capacitors involve the application of a paste using conventional printing methods in alternating layers of dielectric and electrodes.

The electrodes incorporate metals or alloys. A sintering step can result in the oxidation of the metal unless the sintering of the layered structure is performed in a reducing atmosphere. However, sintering of the dielectric material in a reducing atmosphere can result in the reduction of the dielectric materials, which can lower the specific resistance and the corresponding capacitance of the structure. Specific types of dielectric material are selected to resist reduction during sintering in a reducing atmosphere. A desirable dielectric composition having desirable dielectric and stability properties include $BaTiO_3$ as a main component along with optional additional metal/metalloid oxides as property modifiers.

In conventional chip capacitor processing, a plurality of chip capacitors is simultaneously printed as a periodic monolithic structure. The monolithic structure is cut to form the individual chip capacitors. To form the monolithic structure, layers are printed from a paste formed with an organic or aqueous dispersant. Various polymer binders, such as ethyl cellulose, polyvinyl butyral, and the like, generally are also used at low concentrations in forming the paste. The paste for formation of the dielectric material can include the desired metal oxides or other metal compositions that decompose into the metal oxides upon sintering. Similarly, the electrode paste can be formed from powders of the desired metals or alloys or metal compositions that convert to the metals or alloys upon sintering under reducing conditions. The layers are successively printed onto a polyethylene terephthalate (PET) polymer substrate or the like.

After printing the desired layers, the layered structure is then cut into desired shapes. The capacitors are pealed from the substrate before or after they are cut into individual units. The binder and dispersant are removed by heating at moderate temperatures in air. This moderate temperature is generally low enough that the inorganic particles are not significantly affected during this initial heating process. The structures are then sintered at a higher temperature under low oxygen partial pressures to complete the formation of a structure with alternating layers forming the capacitor. In particular, the electrode layers are formed as a uniform metallic layer with elemental metal or alloy, and the dielectric layers densify to form a compact capacitor structure.

Approaches have been developed for the production of highly uniform submicron and nanoscale particles by laser pyrolysis. Highly uniform particles are desirable for the fabrication of a variety of devices including, for example, batteries, polishing compositions, catalysts, and phosphors for optical displays. Laser pyrolysis involves an intense light beam that drives the chemical reaction of a reactant stream to form a flow of highly uniform particles following the rapid quench of the stream after leaving the light beam. Laser pyrolysis approaches have been adapted for the production of highly uniform coatings on substrate surfaces using an approach called light reactive deposition. Light reactive deposition can be used for the deposition of a variety of different compositions, by adapting reactant delivery techniques developed for laser pyrolysis. Light reactive deposition is suitable for the formation of multiple layers of different compositions.

SUMMARY OF THE INVENTION

In a first aspect, the invention pertains to a method for producing ceramic chip capacitors. The method includes depositing at least two layers of electrical conductor and at least one layer of dielectric between the electrical conductor layers. The compositions in the dielectric layer generally are deposited from a flow in which flowing reactants react to form product particles in a reaction driven by light at a light reaction zone.

In a further aspect, the invention pertains to a ceramic chip capacitor having at least two layers of electrical conductor and at least one layer of dielectric between the electrical conducting layers. The dielectric layers include a collection of particles having an average diameter less than about 90 nm in which the collection of particles comprise $BaTiO_3$.

In another aspect, the invention pertains to a collection of particles comprising barium titanate. The collection of particle has an average diameter less than about 90 nm.

In addition, the invention pertains to a method for producing barium titanate. The method includes reacting a flow comprising a barium precursor and a titanium precursor.

DETAILED DESCRIPTION OF THE INVENTION

Dielectric materials and/or electrical conducting materials for chip capacitors can be deposited in layers as the materials are produced in a flowing reactant system. By depositing the materials with a flow reactor, the process for the formation of chip capacitors can be streamlined since the particles are deposited without collecting the particles in a separate collector. The light reactive deposition process is extremely flexible with respect to selection of the composition of the materials in the dielectric layer. In addition, extremely small particles can be deposited for the formation of the dielectric materials. Similarly, elemental metal particles can be deposited for the formation of the electrodes. In light reactive deposition, each layer can be formed by movement of the substrate past a particle flow from a light reaction zone. Thus, all the layers of a multi-layer structure can be formed by repeated passes through the coating stream. The composition of the reactant stream can be varied to produce the desired material for a particular layer.

Capacitors have electrodes separated by a dielectric material. Higher capacity can be obtained by using a material with a higher dielectric constant. Chip capacitors generally include multiple layers to achieve high capacity with a small area. The capacitors can have a very small size for incorporation into various circuits. A single board or circuit can include a plurality of chip capacitors.

Figure 1:
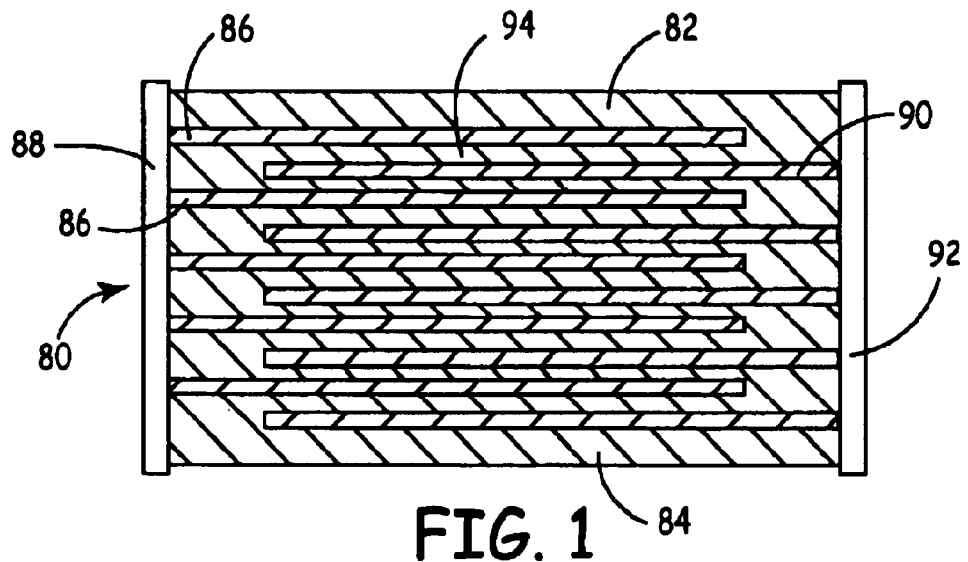
FIG. 1 is a sectional view of a multi-layer chip capacitor with alternating electrodes and dielectric.
Figure 12:
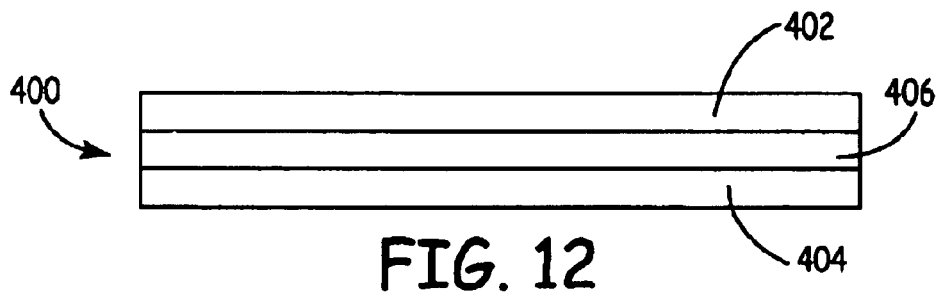
FIG. 12 is a sectional view of a three-layer capacitor structure.

A chip capacitor generally includes a relatively large number of alternating layers of electrodes, i.e., electrical conductors, and dielectric. Adjacent electrodes generally have opposite polarity with dielectric separating the electrodes to generate the capacitance. Each layer generally is thin to obtain a higher capacitance. An example of a chip capacitor structure is shown in FIG. 1. The structure of capacitor 80 is bounded with a top dielectric layer 82 and a bottom dielectric layer 84. Capacitor 80 includes a set of first electrodes 86 in electrical contact with first end electrode 88 and a set of second electrodes 90 in electrical contact with second end electrode 92. First electrodes 86 and second electrodes 90 form opposite poles of capacitor 80. End electrodes 88, 92 provide for electrical connection of chip capacitor 80 with a corresponding circuit. Dielectric layers 94 are located between alternating electrodes.

Electrodes 86, 90 are electrically conductive and generally include elemental metal or alloy. Dielectric layers 82, 84, 94 generally are formed from an inorganic material with a large dielectric constant. Suitable dielectric materials include certain metal oxides. Particularly suitable dielectric materials include a majority of barium titanate ($BaTiO_3$), optionally mixed with other metal oxides. Barium titanate has a large dielectric constant and is resistant to reduction upon heating in an atmosphere with a low oxygen partial pressure. While barium titanate is desirable due to its large dielectric constant, other dielectric oxides suitable for incorporation into ceramic chip capacitors with appropriate dopants include, for example, $SrTiO_3$, $CaTiO_3$, $SrZrO_3$, $CaZrO_3$, $Nd_2O_3$—$2TiO_3$ and $La_2O_3$—$2TiO_2$.

Recently, an approach called light reactive deposition has been developed for the formation of powder/particle coatings. In particular, light reactive deposition can be used for consolidation of silicon oxide powders into optical glasses, although light reactive deposition can be used for a wide range of coating compositions. Light reactive deposition can be performed at relatively high deposition rates compared with other coating approaches with the capability of producing extremely smooth and uniform coatings and with the versatility of incorporating a wide range of compositions for deposition. A wide range of metal precursors in a vapor phase and/or in an aerosol can be flowed for processing by light reactive deposition. Appropriate blends of precursors can be used to achieve desired compositions of the resulting material including the production of dielectric materials and metal electrodes.

Light reactive deposition uses an intense light beam to drive a chemical reaction to produce particles within a well-defined reaction zone that overlaps with the light beam. High production rates are especially possible using an elongated reactant inlet that is aligned with the light beam such that the reaction zone is extended along the corresponding elongated reactant stream. A segment of the substrate can be coated simultaneously using a resulting elongated product stream. The coating can be performed within the reaction chamber or in a separate coating chamber.

As with conventional chip capacitor production, the chip capacitor formed by light reactive deposition generally is initially formed in contact with a substrate from which the chip can later be separated. A large number of chips are produced simultaneously in a monolithic structure. The chip structures are cut from the monolithic structure to form the individual chips. The monolithic structure is formed by applying multiple layers on the substrate using multiple passes through the product particle stream emanating from the light reactive zone. The composition of the reactant stream can be varied between passes through the product particle stream to produce the desired coating material. Specifically, the compositions can be changed to generate the electrically conductive material of the electrode layers and the dielectric material of the dielectric layers. Each layer of material can be produced from a single pass through the coating apparatus or with multiple passes through the coating apparatus.

After the deposition of the particles/powders, the particles are processed to form the chip capacitor structure. Generally, after depositing layers of powder, the structure is sintered to form a uniform electrically conductive material for the electrode and to compact the dielectric material. The sintering can be performed after deposition of all of the layers or after the deposition of any number of layers with additional sintering performed after additional layer deposition. Barium titanate has a very high melting point such that the sintering process generally does result in the formation of a uniform material of barium titanate blended with the additional metal oxide property modifiers. The cutting of the individual chip capacitors can be performed before or after the sintering process.

Coating Formation

Light reactive deposition is a coating approach that uses an intense light source to drive synthesis of desired compositions from a flowing reactant stream. Light reactive deposition generally results in deposition of powders, although hot particles deposited on the surface can partly fuse during the deposition process due to their temperature. Light reactive deposition has similarities with laser pyrolysis for powder synthesis in that an intense light source drives the reaction. Laser pyrolysis involves a flowing reactant stream that intersects with an intense light beam at a reaction zone where reaction products form particles. While the particles produced in laser pyrolysis are collected for subsequent use, in light reactive deposition, the resulting compositions are directed to a substrate surface where a coating is formed. The characteristics of laser pyrolysis that lead to the production of highly uniform particles can be correspondingly implemented in the production of coatings with high uniformity.

In light reactive deposition, the coating of the substrate can be performed in a coating chamber separate from the reaction chamber or the coating can be performed within the reaction chamber. In either of these configurations, the reactant delivery system can be configured similarly to a reactant delivery system for a laser pyrolysis apparatus for the production of particles with various compositions. Thus, a wide range of coatings can be formed for further processing into selected materials.

If the coating is performed in a coating chamber separate from the reaction chamber, the reaction chamber is essentially the same as the reaction chamber for performing laser pyrolysis, although the reactant throughput and the reactant stream size may be designed to be appropriate for the coating process. For these embodiments, the coating chamber and a conduit connecting the coating chamber with the reaction chamber replace the collection system of the laser pyrolysis system. If the coating is performed within the reaction chamber, a substrate intercepts a flow from the reaction zone to directly deposit particles onto a substrate.

A laser pyrolysis apparatus design incorporating an elongated reactant inlet has been developed that facilitates production of commercial quantities of particles. This design has been described in U.S. Pat. No. 5,958,348 to Bi et al., entitled "Efficient Production of Particles by Chemical Reaction," incorporated herein by reference. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference. These designs for commercial production of powders by laser pyrolysis can be adapted for rapid coating of a wide range of materials by light reactive deposition.

In some embodiments of a high capacity laser pyrolysis apparatus, the reaction chamber and reactant inlet are elongated significantly along the light beam to provide for an increase in the throughput of reactants and products. The delivery of gaseous/vapor reactants and/or aerosol reactants, as described further below, can be adapted for the elongated reaction chamber design. In any of the embodiments, the reactant delivery inlet into the reaction chamber generally is configured to deliver a reactant stream with dimensions that results in a product stream with desired dimensions for the deposition process. Specifically, the size of the elongated reactant inlet can be selected based on the size of the substrate to be coated. For example, in some embodiments, the reactant inlet has a width approximately the same size or slightly larger than the width of a substrate such that the substrate can be coated along its entire width with one pass through the product stream without wasting excessive amount of product.

In general, the particle production apparatus with the elongated reaction chamber and reactant inlet is designed to reduce contamination of the chamber walls, to increase the production capacity and to make efficient use of resources. To accomplish these objectives, the elongated reaction chamber can provide for an increased throughput of reactants and products without a corresponding increase in the dead volume of the chamber. The dead volume of the chamber can become contaminated with unreacted compounds and/or reaction products. Furthermore, an appropriate flow of shielding gas confines the reactants and products within a flow stream through the reaction chamber. The high throughput of reactants makes efficient use of the light energy.

Figure 2:
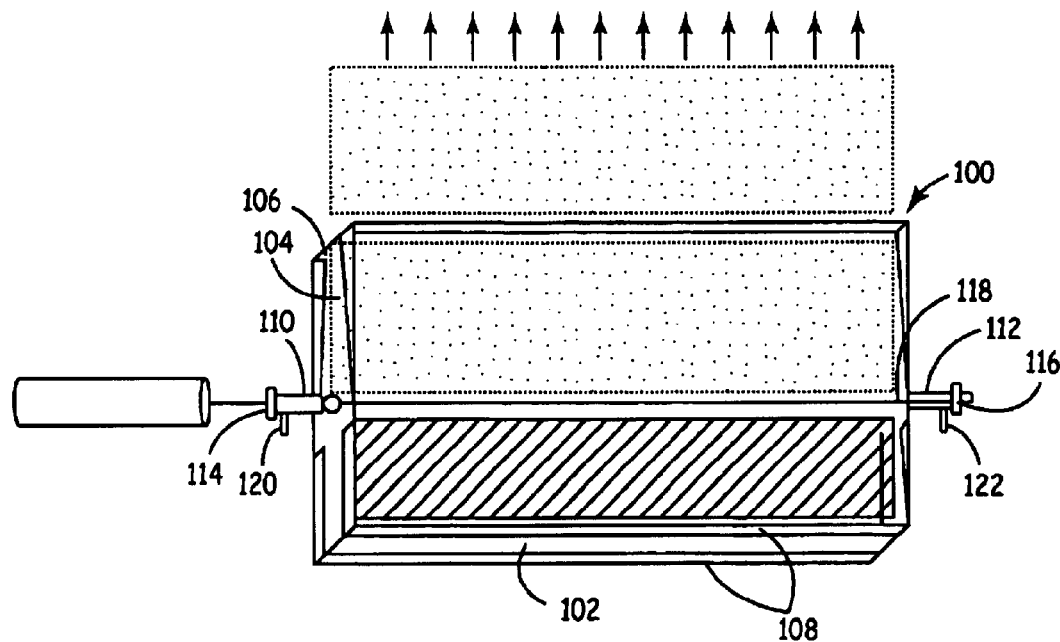
FIG. 2 is a side perspective view of a reaction chamber for performing laser pyrolysis synthesis of powders at high production rates.

The design of the improved reaction chamber 100 is shown schematically in FIG. 2. A reactant inlet 102 leads to main chamber 104. Reactant inlet 102 conforms generally to the shape of main chamber 104. Main chamber 104 includes an outlet 106 along the reactant/product stream for removal of particulate products, any unreacted gases and inert gases. Shielding gas inlets 108 are located on both sides of reactant inlet 102. Shielding gas inlets are used to form a blanket of inert gases on the sides of the reactant stream to inhibit contact between the chamber walls and the reactants or products. The dimensions of elongated reaction chamber 104 and reactant inlet 102 can be designed for high efficiency particle production. Reasonable dimensions for reactant inlet 102 for the production of particles, when used with an 1800 watt $CO_2$ laser, are from about 5 mm to about 1 meter.

Tubular sections 110, 112 extend from the main chamber 104. Tubular sections 110, 112 hold windows 114, 116 to define a light beam path 118 through the reaction chamber 100. Tubular sections 110, 112 can include inert gas inlets 120, 122 for the introduction of inert gas into tubular sections 110, 112.

Outlet 106 can lead to a conduit directed to a coating chamber. There is not necessarily a change in dimension that demarcates a transition from the reaction chamber to a conduit to the coating chamber. The reaction zone is located within the reaction chamber, and the conduit can but not necessarily involves a change in direction of the flow.

Figure 3:
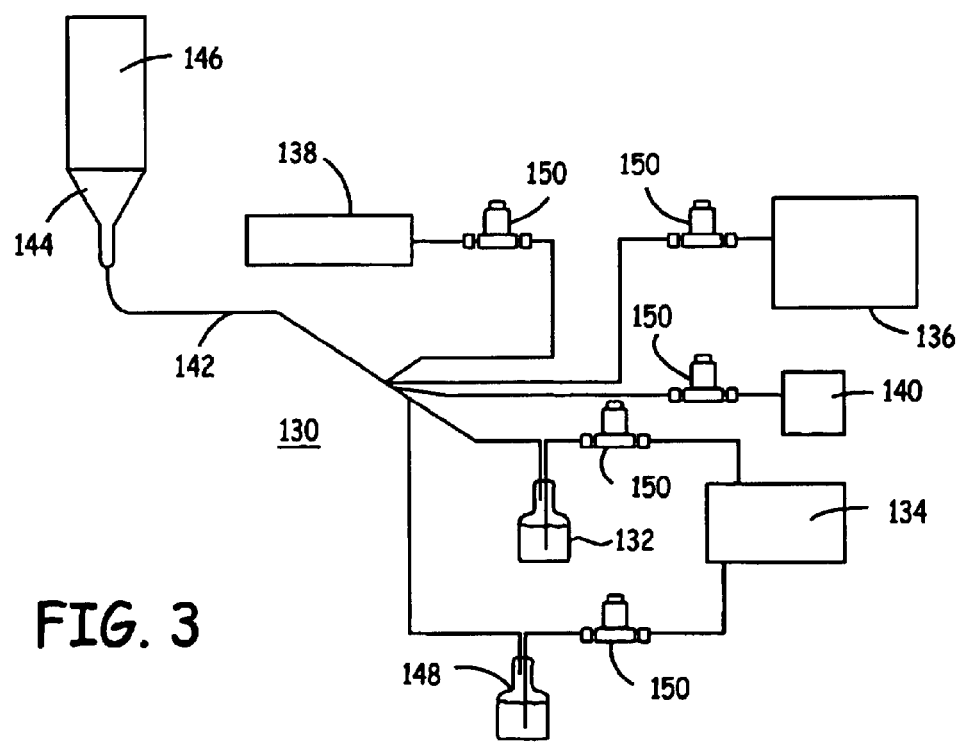
FIG. 3 is a schematic representation of a reactant delivery system for the delivery of vapor/gas reactants to a flowing reaction system, such as the laser pyrolysis reactor of FIG. 2.

The reactant inlet is generally connected to a reactant delivery system. Referring to FIG. 3, an embodiment 130 of a reactant delivery apparatus includes a source 132 of a precursor compound. For liquid or solid reactants, a carrier gas from one or more carrier gas sources 134 can be introduced into precursor source 132 to facilitate delivery of the reactant. Precursor source 132 can be a liquid holding container, a solid precursor delivery apparatus or other suitable container. The carrier gas from carrier gas source 134 can be, for example, either an infrared absorber, an inert gas or mixtures thereof.

The gases/vapors from precursor source 132 can be mixed with gases from infrared absorber source 136, inert gas source 138 and/or gaseous reactant source 140 by combining the gases in a single portion of tubing 142. The gases are combined a sufficient distance from the reaction chamber such that the gases become well mixed prior to their entrance into the reaction chamber. The combined gas in tube 142 passes through a duct 144 into channel 146, which is in fluid communication with a reactant inlet, such as 102 in FIG. 2.

A second reactant can be supplied as a vapor from second reactant source 148, which can be a liquid reactant delivery apparatus, a solid reactant delivery apparatus, a gas cylinder or other suitable container or containers. As shown in FIG. 3, second reactant source 148 delivers a second reactant to duct 144 by way of tube 142. Alternatively, second reactant source can deliver the second reactant into a second duct such that the two reactants are delivered separately into the reaction chamber where the reactants combine at or near the reaction zone. Mass flow controllers 150 can be used to regulate the flow of gases/vapors within the reactant delivery system of FIG. 3. Additional reactants can be provided similarly.

As noted above, the reactant stream can include one or more aerosols. The aerosols can be formed within the reaction chamber or outside of the reaction chamber prior to injection into the reaction chamber. If the aerosols are produced prior to injection into the reaction chamber, the aerosols can be introduced through reactant inlets comparable to those used for gaseous reactants, such as reactant inlet 102 in FIG. 2.

Figure 4:
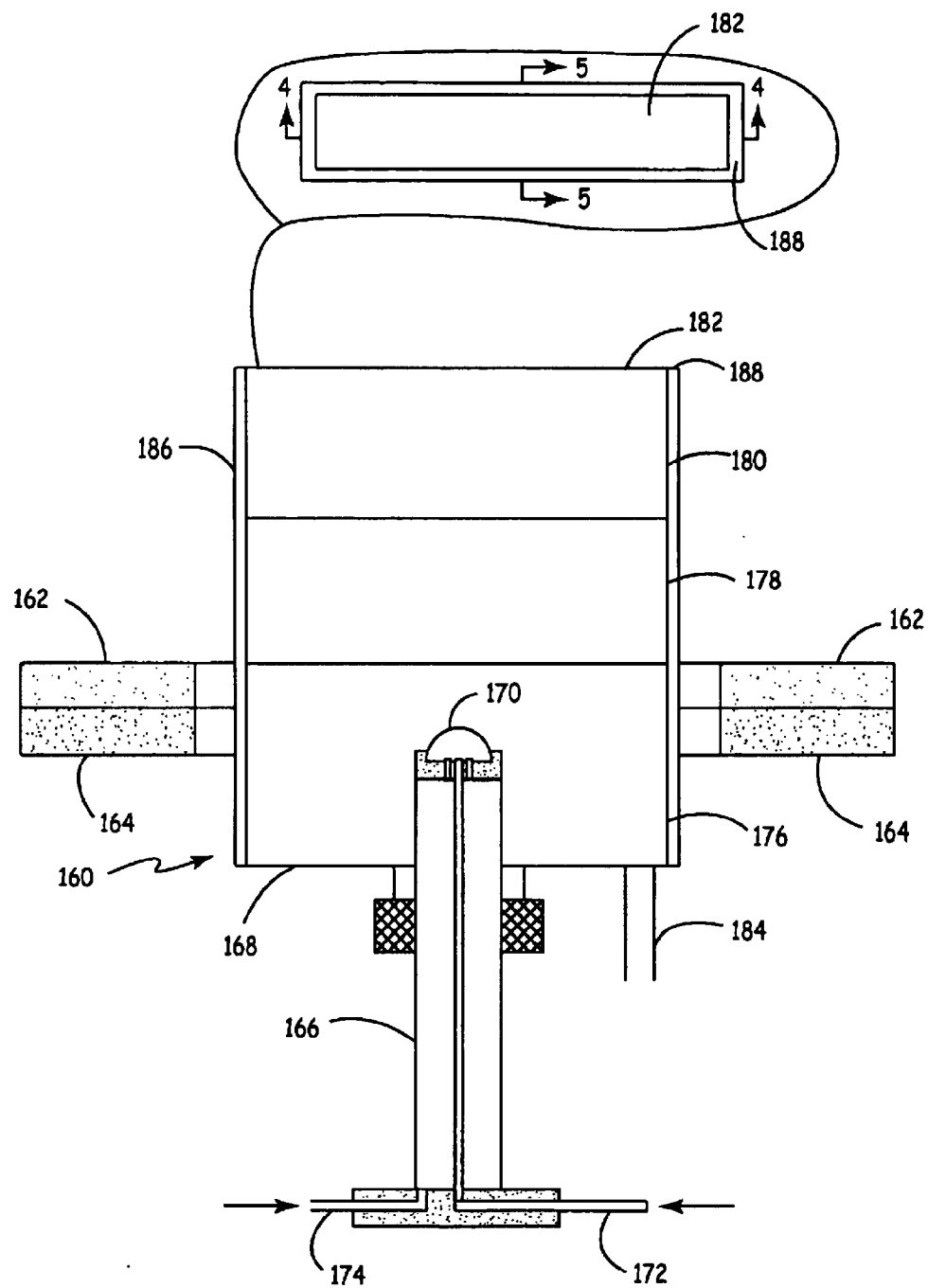
FIG. 4 is a sectional side view of a reactant inlet nozzle with an aerosol generator for the delivery of aerosol and gas/vapor compositions into a reaction chamber, wherein the cross section is taken along line 4—4 of the insert. The insert shows a top view of an elongated reactant inlet.
Figure 5:
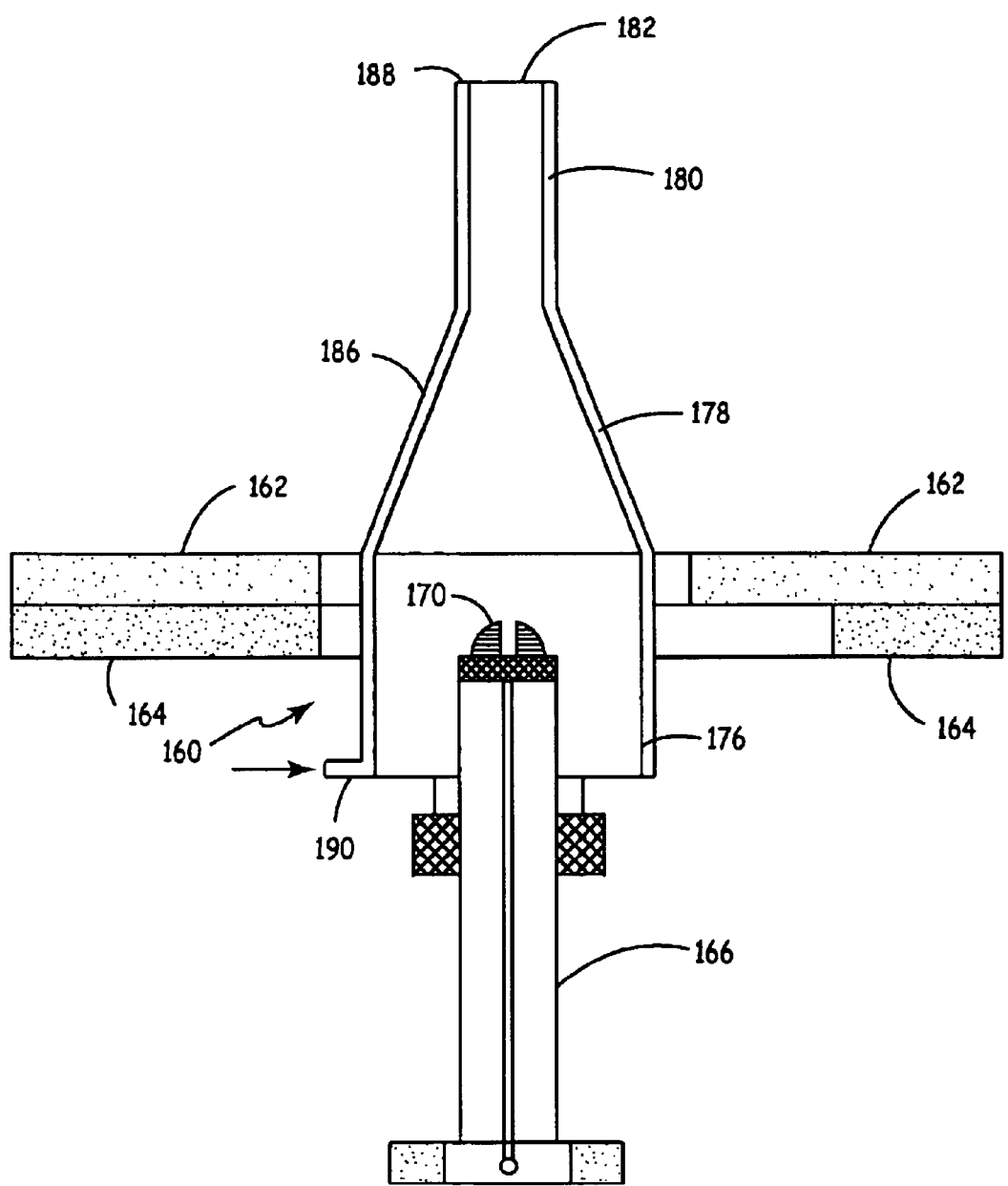
FIG. 5 is a sectional side view of the reactant inlet nozzle of FIG. 4 taken along the line 5—5 of the insert in FIG. 4.

An embodiment of a reactant delivery nozzle configured to deliver an aerosol reactant is shown in FIGS. 4 and 5. Inlet nozzle 160 connects with a reaction chamber at its lower surface 162. Inlet nozzle 160 includes a plate 164 that bolts into lower surface 162 to secure inlet nozzle 160 to the reaction chamber. Inlet nozzle 160 includes an inner nozzle 166 and an outer nozzle 168. Inner nozzle 166 can have, for example, a twin orifice internal mix atomizer 170 at the top of the nozzle. Suitable gas atomizers are available from Spraying Systems, Wheaton, Ill. The twin orifice internal mix atomizer 170 has a fan shape to produce a thin sheet of aerosol and gaseous compositions. Liquid is fed to the atomizer through tube 172, and gases for introduction into the reaction chamber are fed to the atomizer through tube 174. Interaction of the gas with the liquid assists with droplet formation.

Outer nozzle 168 includes a chamber section 176, a funnel section 178 and a delivery section 180. Chamber section 176 holds the atomizer of inner nozzle 166. Funnel section 178 directs the aerosol and gaseous compositions into delivery section 180. Delivery section 180 leads to a rectangular reactant opening 182, shown in the insert of FIG. 4. Reactant opening 182 forms a reactant inlet into a reactant chamber for laser pyrolysis or light reactive deposition. Outer nozzle 168 includes a drain 184 to remove any liquid that collects in the outer nozzle. Outer nozzle 168 is covered by an outer wall 186 that forms a shielding gas opening 188 surrounding reactant opening 182. Inert shielding gas is introduced through tube 190. Additional embodiments for the introduction of an aerosol with one or more aerosol generators into an elongated reaction chamber is described in commonly assigned and copending U.S. Pat. No. 6,193,939 to Gardner et al., entitled "Reactant Delivery Apparatuses," incorporated herein by reference.

For the formation of oxides, suitable secondary reactants serving as an oxygen source include, for example, $O_2$, CO, $N_2O$, $H_2O$, $CO_2$, $O_3$ and mixtures thereof. Molecular oxygen can be supplied as air. Alternatively, oxygen can be provided in the metal precursor compound, such as a carbonyl. Sources of nitrogen for nitrides include, for example, ammonia, $NH_3$, and sources of sulfur for sulfides include, for example, $H_2S$. Sources of carbon for carbides include, for example, organic anions, such as acetates and the like, that can be included in the metal precursors. A secondary reactant compound, if present, should not react significantly with the metal precursor prior to entering the reaction zone since this generally would result in the formation of large particles.

Laser pyrolysis/light reactive deposition can be performed with a variety of optical frequencies, using either a laser or other strong focused light source. Convenient light sources operate in the infrared portion of the electromagnetic spectrum. $CO_2$ lasers are particularly suitable sources of light. Infrared absorbers for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the reaction.

Generally, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. In light reactive deposition, the reaction process is qualitatively different from the process in a combustion reactor where an energy source initiates a reaction, but the reaction is driven by energy given off by an exothermic reaction. In a combustion reactor, there generally is no well-defined reaction zone with a boundary. The reaction zone is large and the residence time of the reactants is long. Lower thermal gradients are generally present in the combustion reactor. In contrast, the laser/light driven reactions have extremely high heating and quenching rates. The laser/light intensity is controllable such that the reaction conditions are similarly controllable.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases include, for example, Ar, He and $N_2$.

Figure 6:
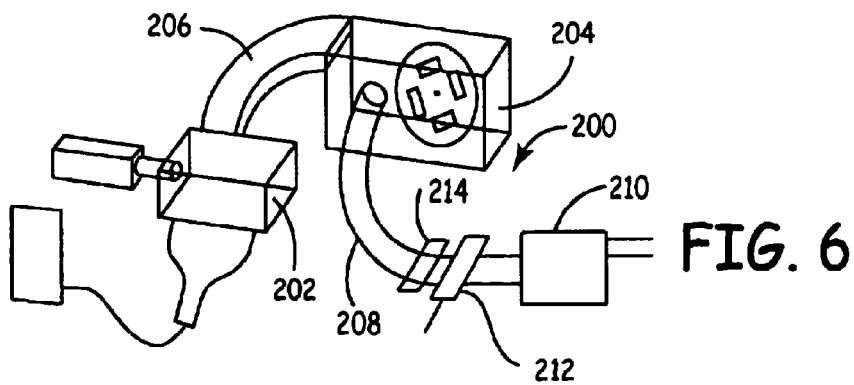
FIG. 6 is a schematic diagram of a light reactive deposition apparatus formed with a particle production apparatus connected to a separate coating chamber through a conduit.

The outlet of a laser pyrolysis apparatus can be adapted for the coating of substrates within a separate coating chamber. A coating apparatus with separate reaction chamber and coating chamber is shown schematically in FIG. 6. The coating apparatus 200 comprises a reaction chamber 202, a coating chamber 204, a conduit 206 connecting reaction chamber 202 with coating chamber 204, an exhaust conduit 208 leading from coating chamber 204 and a pump 210 connected to exhaust conduit 208. A valve 212 can be used to control the flow to pump 210. Valve 212 can be, for example, a manual needle valve or an automatic throttle valve. Valve 212 can be used to control the pumping rate and the corresponding chamber pressures. A collection system, filter, scrubber or the like 214 can be placed between the coating chamber 204 and pump 210 to remove particles that did not get coated onto the substrate surface.

Figure 7:
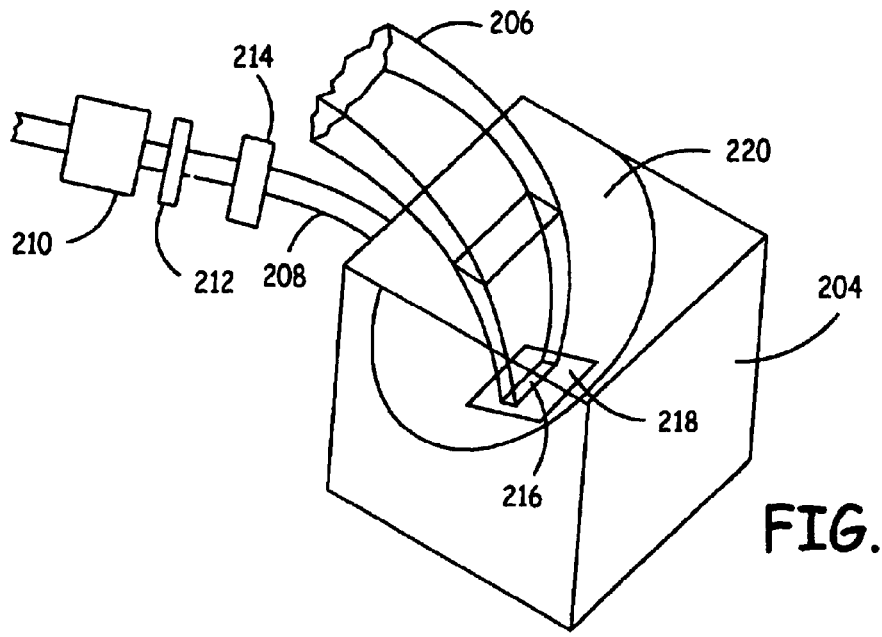
FIG. 7 is a perspective view of a coating chamber where the walls of the chamber are transparent to permit viewing of the internal components.

Referring to FIG. 7, conduit 206 from the particle production apparatus 202 leads to coating chamber 204. Conduit 206 terminates at opening 216 within chamber 204. In some embodiments, conduit opening 216 is located near the surface of substrate 218 such that the momentum of the particle stream directs the particles directly onto the surface of substrate 218. Substrate 218 can be mounted on a stage or other platform 220 to position substrate 218 relative to opening 216.

Figure 8:
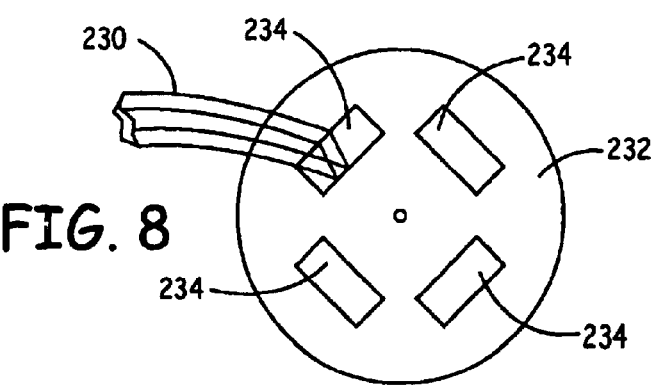
FIG. 8 is perspective view of a particle nozzle directed at a substrate mounted on a rotating stage.

An embodiment of a stage to position a substrate relative to the conduit from the particle production apparatus is shown in FIG. 8. A particle nozzle 230 directs particles toward a rotating stage 232. As shown in FIG. 8, four substrates 234 are mounted on stage 232. More or fewer substrates can be mounted on a moveable stage with corresponding modifications to the stage and size of the chamber. A motor is used to rotate stage 232.

Movement of stage 232 sweeps the particle stream across a surface of one particular substrate 234 within the path of nozzle 230. Stage 232 can be used to pass sequential substrates through the product stream for one or more coating applications. Stage 232 can include thermal control features that provide for the control of the temperature of the substrates on stage 232. Alternative designs involve the linear movement of a stage or other motions. In other embodiments, the particle stream is unfocused such that an entire substrate or the desired portions thereof is simultaneously coated without moving the substrate relative to the product flow.

If the coating is performed within the reaction chamber, the substrate is mounted to receive product compositions flowing from the reaction zone. The compositions may not be fully solidified into solid particles, although quenching may be fast enough to form solid particles. Whether or not the compositions are solidified into solid particles, the particles can be highly uniform. The distance from the reaction zone to the substrate can be selected to yield desired coating results.

Figure 9:
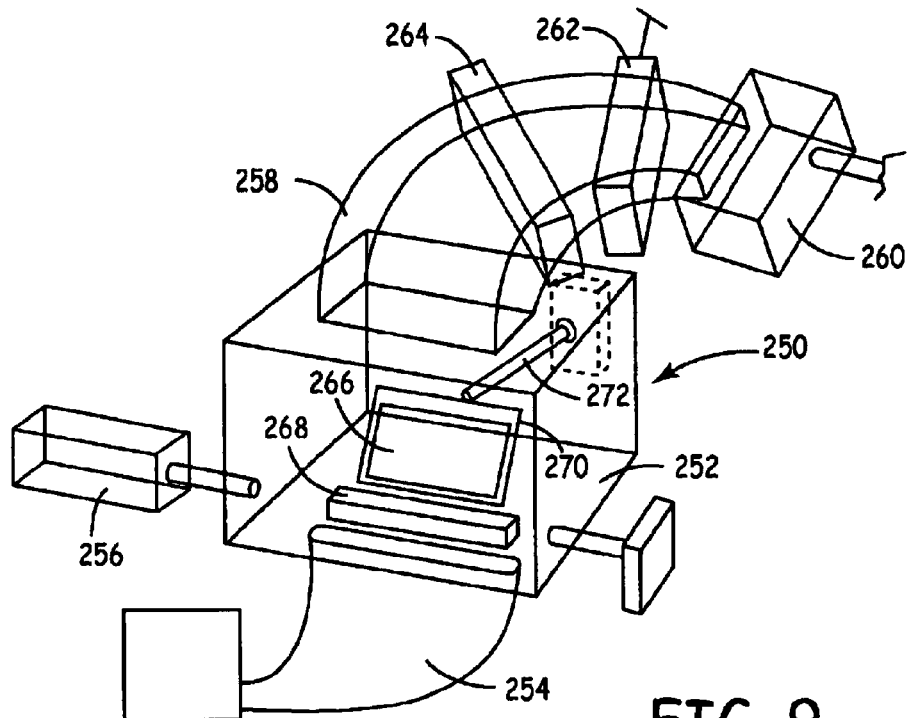
FIG. 9 is a schematic diagram of a light reactive deposition apparatus in which a particle coating is applied to a substrate within the particle production chamber.

An apparatus 250 to perform substrate coating within the reaction chamber is shown schematically in FIG. 9. The reaction/coating chamber 252 is connected to a reactant supply system 254, a radiation source 256 and an exhaust 258. Exhaust 258 can be connected to a pump 260, although the pressure from the reactant stream itself can maintain flow through the system. A valve 262 can be used to control the flow to pump 260, thereby adjusting the pumping rate and the corresponding chamber pressures. A collection system, filter, scrubber or the like 264 can be placed between chamber 252 and pump 260 to remove particles that did not get coated onto the substrate surface.

Substrate 266 can contact flow from a reaction zone 268 to coat the substrate with product particles/powders. Substrate 266 can be mounted on a stage, conveyor, or the like 270 to sweep substrate 266 through the flow. Stage 270 can be connected to an actuator arm 272 or other motorized apparatus to move stage 270 to sweep the substrate through the product stream. Various configurations can be used to sweep the coating across the substrate surface as the product leaves the reaction zone. A shown in FIG. 9, actuator arm 272 translates stage 270 to sweep substrate 266 through the product stream.

Figure 10:
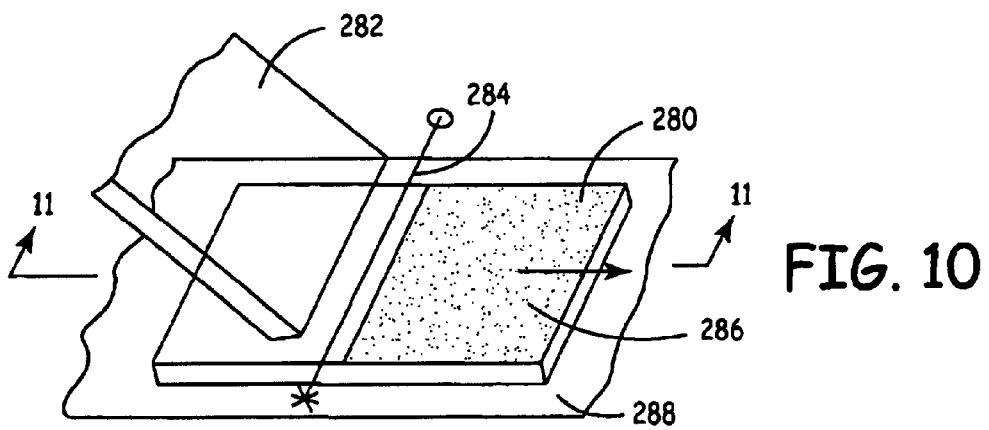
FIG. 10 is a perspective view of a reactant nozzle delivering reactants to a reaction zone positioned near a substrate.
Figure 11:
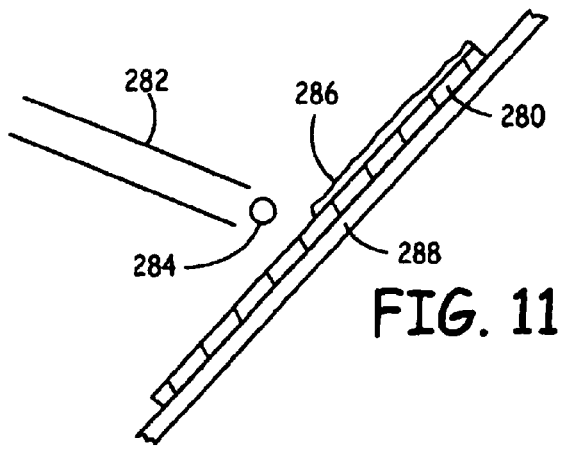
FIG. 11 is a sectional view of the apparatus of FIG. 10 taken along line 11—11.

A similar embodiment is shown in an expanded view in FIGS. 10 and 11. A substrate 280 moves relative to a reactant nozzle 282, as indicated by the right directed arrow. Reactant nozzle 282 is located just above substrate 280. An optical path 284 is defined by suitable optical elements that direct a light beam along path 284. Optical path 284 is located between nozzle 282 and substrate 280 to define a reaction zone just above the surface of substrate 280. The hot particles tend to attract to the cooler substrate surface.

Referring to FIGS. 10 and 11, a particle coating 286 is formed as the substrate is scanned past the reaction zone. In general, substrate 280 can be carried on a conveyor/stage 288. Conveyor/stage 288 can be connected to an actuator arm, as shown in FIG. 9. In alternative embodiments, rollers and a motor, a continuous belt conveyor, or any of a variety of design, including known designs, for translating a substrate can be used to carry the substrate.

In some embodiments, the position of conveyor 288 can be adjusted to alter the distance from substrate 286 to the reaction zone. Changes in the distance from substrate to the reaction zone correspondingly alter the temperature of the particles striking the substrate. The temperature of the particles striking the substrate generally alters the properties of the resulting coating and the requirements for subsequent processing, such as a subsequent heat processing consolidation of the coating. The distance between the substrate and the reaction zone can be adjusted empirically to produce desired coating properties. In addition, the stage/conveyor supporting the substrate can include thermal control features such that the temperature of the substrate can be adjusted to higher or lower temperatures, as desired.

The temperature of the substrate during the deposition process can be adjusted to achieve particular objectives. For example, the substrate can be cooled during the deposition process since a relatively cool substrate can attract the particles to its surface. However, in some embodiments, the substrate is heated, for example to about 500° C., during the deposition process. Particles stick better to a heated substrate. In addition, the particles tend to compact and, if the material is appropriate, fuse on a heated substrate such that a subsequent consolidation or sintering of the coating can be facilitated if the coating were formed initially on a heated substrate.

For the production of discrete devices or structures on a substrate surface formed by the coating formed by the coating process, various patterning approaches can be used. For example, conventional approaches from integrated circuit manufacturing, such as photolithography and dry etching, can be used to pattern the coating following deposition. Alternatively, the deposition process can be designed to only coat a portion of the substrate. Therefore, the deposition process itself can be manipulated to produce structures. For example, masking can be used during the coating process to only coat a selected portion of the substrate, or the mass flow controllers feeding reactants can be adjusted to vary the composition of the coating at selected locations along the substrate. For example, the deposition of stripes of material can be used to construct corresponding devices that can take advantage of the variation in composition.

Before or after patterning, the coating can be heat processed to transform the coating. For some materials, the heat processing is a sintering process to transform a coating from a layer of discrete particles into a continuous layer of actual material. The heat processing can be also effective at densifying a powder layer along with some sintering and possible combination of materials to form dopants or blends.

The formation of coatings by light reactive deposition, silicon glass deposition and optical devices are described further in copending and commonly assigned U.S. patent application Ser. No. 09/715,935 to Bi et al., entitled "Coating Formation By Reactive Deposition," incorporated herein by reference.

Deposited Materials

A variety of particles can be produced by laser pyrolysis. Adaptation of laser pyrolysis for the performance of light reactive deposition can be used to produce coatings of comparable compositions as the particles that can be produced by laser pyrolysis. Powders that can be produced by light reactive deposition include, for example, silicon particles, metal particles, and metal/metalloid compounds, such as, metal/metalloid oxides, metal/metalloid carbides, metal/metalloid nitrides, metal/metalloid sulfides. Generally, the powders include fine or ultrafine particles with particle sizes in the submicron or nanometer range. Elemental metal powders are of particular interest for deposition in the electrode layers, and metal oxides are of particular interest for deposition into the dielectric layers.

Light reactive deposition is particularly suitable for the formation of highly uniform particles, especially nanoscale particles. In particular, light reactive deposition can produce a coating of particles of interest generally with an average diameter for the primary particles of less than about 500 nm, alternatively less than about 90 nm, similarly from about 3 nm to about 75 nm, and also from about 3 nm to about 50 nm. Smaller particles can be used advantageously in capacitors because they can form smoother and more uniform coatings. Therefore, thinner layers can be formed using smaller particles.

Light reactive deposition, as described above, generally results in primary particles having a very narrow range of particle diameters. With aerosol delivery of reactants for light reactive deposition, the distribution of particle diameters can be particularly sensitive to the reaction conditions. Nevertheless, if the reaction conditions are properly controlled, a very narrow distribution of particle diameters can be obtained with an aerosol delivery system.

Furthermore, in embodiments with highly uniform particles, effectively no primary particles have an average diameter greater than about 4 times the average diameter and in other embodiments 3 times the average diameter, and in further embodiments 2 times the average diameter. In other words, the particle size distribution effectively does not have a tail indicative of a small number of particles with significantly larger sizes. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be advantageous for obtaining highly uniform coatings and for thinner coatings.

In addition, the particles can have a very high purity level. The nanoparticles produced by the above described methods are expected to have a purity greater than the reactants because the reactions and, when applicable, the crystal formation process tends to exclude contaminants from the particle. Some impurities on the surface of the particles may be removed by heating the particles.

In general, the coating can be made a uniform thickness, or different portions of the substrate can be coated with different thicknesses of particles. Different coating thicknesses can be applied by varying the sweep speed of the substrate relative to the particle nozzle, by making multiple sweeps of portions of the substrate that receive a thicker particle coating, or by using a mask or the like to limit the coating to certain portions of the substrate. The particle composition can be similarly varied over different portions of the substrate. This can be accomplished, for example, by changing the reactant stream during the coating process and by directing the particular compositions toward selected portions of the substrate. The formation of suitable layers for the formation of chip capacitors is described in detail below.

Several different types of nanoscale particles have been produced by laser pyrolysis. Similar particles can be deposited in coating by light reactive deposition based on the description above. In particular, many materials suitable for the production of chip capacitors can be produced by light reactive deposition.

Specifically, various metal oxides and metalloid oxides have been produced by laser pyrolysis. These particles include, for example, silicon oxide, vanadium oxide, silver vanadium oxide, manganese oxide, lithium manganese oxide, titanium oxide, aluminum oxide, tin oxide, zinc oxide and iron oxide. In many embodiments, particular oxidation states can be produced. The production of these oxides is summarized in copending and commonly assigned U.S. patent application Ser. No. 09/818,141, now U.S. Pat. No. 6,599,631 to Kambe et al., entitled "Polymer/Inorganic Particle Compositions," incorporated herein by reference.

The production of iron and iron carbide is described in a publication by Bi et al., entitled "Nanocrystalline α-Fe, $Fe_3C$, and $Fe_7C_3$ produced by $CO_2$ laser pyrolysis," J. Mater. Res. Vol. 8, No. 7, pages 1666–1674 (July 1993), incorporated herein by reference. The production of nanoparticles of silver metal is described in copending and commonly assigned U.S. patent application Ser. No. 09/311,506, now U.S. Pat. No. 6,391,494 to Reitz et al., entitled "Metal Vanadium Oxide Particles," incorporated herein by reference. Other elemental metals can be deposited similarly for the production of capacitor electrode layers. The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference. The production of iron sulfide ($Fe_{1-x}S$) nanoparticles by laser pyrolysis is described in Bi et al., "Material Research Society Symposium Proceedings," Vol. 286, pages 161–166 (1993), incorporated herein by reference. While some suitable dielectric materials are oxides, other metal/metalloid compositions can be generated by light reactive deposition, as described in these references.

For the production of chip capacitors, elemental metals are desired for the electrically conductive electrode layers and oxides are desired for the dielectric layers. Suitable elemental metals include, for example, silver, gold, platinum, palladium, iron and nickel. Suitable dielectrics include barium titanate as a majority component along with additional metal oxides as property modifiers. Suitable property modifiers include, for example, $Nb_2O_5$, $Co_3O_4$, MgO, $Bi_2O_3$, $TiO_2$, $V_2O_5$, $MoO_3$, $WO_3$, yttrium oxides, oxides of lanthanides and combinations thereof. Mixed metal/metalloid compositions and doped compositions can be produced by introducing appropriate precursors into the reactant stream. Some representative precursor compounds are presented below for vapor and aerosol delivery. Other precursors compounds can be similarly identified.

Appropriate metal precursor compounds for vapor delivery generally include compounds with reasonable vapor pressures, i.e., vapor pressures sufficient to get desired amounts of precursor vapor in the reactant stream. The vessel holding a solid or liquid precursor compound can be heated to increase the vapor pressure of the precursor, if desired. Suitable titanium precursors for vapor delivery include, for example, titanium tetrachloride ($TiCl_4$), and titanium isopropoxide ($Ti[OCH(CH_3)_2]_4$). Suitable vanadium precursors include, for example, $VCl_4$, $VOCl_2$, $V(CO)_6$ and $VOCl_3$. Suitable liquid, cobalt precursors for vapor delivery include, for example, cobalt tricarbonyl nitrosyl ($Co(CO)_3NO$), and cobalt acetate ($Co(OOCCH_3)_3$). A suitable nickel precursor for vapor delivery includes, nickel carbonyl ($Ni(CO)_4$), a volatile liquid.

Figure 13:
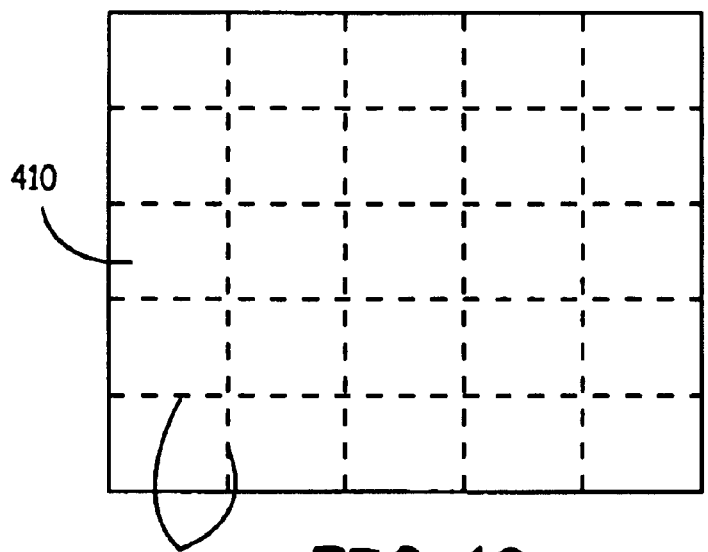
FIG. 13 is a top view of a layered monolithic structure with cut lines for forming individual chip capacitors shown in phantom lines.
Figure 14:
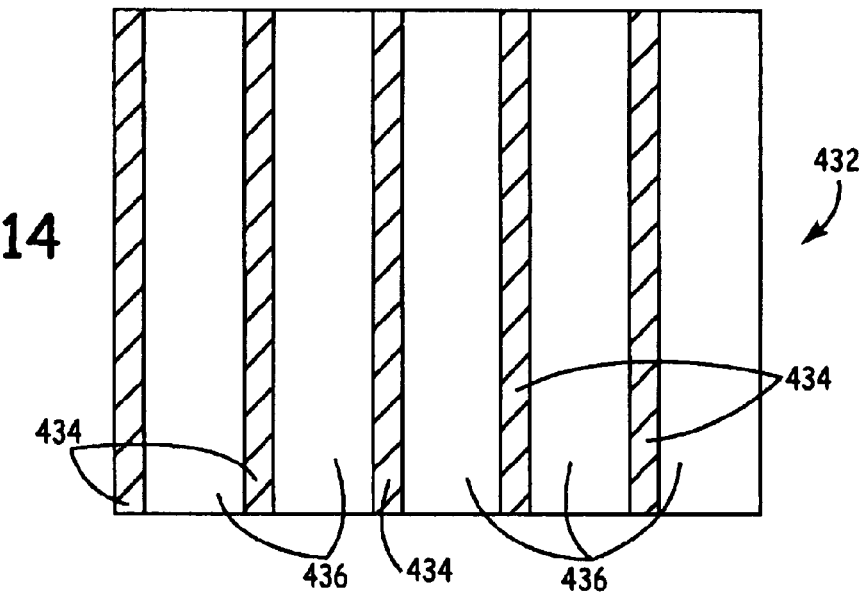
FIG. 14 is a top view of a mask for forming a first set of electrodes within the monolithic structure of FIG. 13.

Using aerosol delivery apparatuses, solid precursor compounds can be delivered by dissolving the compounds in a solvent. Alternatively, powdered precursor compounds can be dispersed in a liquid/dispersant for aerosol delivery. Liquid precursor compounds can be delivered as an aerosol from a neat liquid, a multiple liquid dispersion or a liquid solution. A solvent/dispersant can be selected to achieve desired properties of the resulting solution/dispersion. Suitable solvents/dispersants include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser-absorbing compound may be needed within the reactant stream if a $CO_2$ laser is used as a light source.

If aerosol precursors are used, the liquid solvent/dispersant generally is rapidly evaporated by the light beam in the reaction chamber such that a gas phase reaction can take place. Thus, the fundamental features of the reaction process are unchanged by the presence of an aerosol. Nevertheless, the reaction conditions are affected by the presence of the aerosol.

Suitable barium precursors for aerosol delivery include, for example, barium nitrate ($Ba(NO_3)_2$) and barium chloride ($BaCl_2$), which are soluble in water. Suitable titanium precursors for aerosol delivery include, for example, titanium dichloride ($TiCl_2$), which is soluble in alcohol, and titanium tetrachloride ($TiCl_4$), which is soluble in cold water and alcohol. Suitable vanadium precursors for aerosol production include, for example, vanadium trichloride ($VCl_3$), vanadyl trichloride ($VOCl_3$), vanadyl sulfate hydrate ($VOSO_4.H_2O$), ammonium vanadate ($NH_4VO_3$), vanadium oxide compounds (e.g., $V_2O_5$ and $V_2O_3$, which are soluble in aqueous nitric acid), and vanadyl dichloride ($VOCl_2$), which is soluble in absolute alcohol. Suitable silver precursors include, for example, silver sulfate ($Ag_2SO_4$), silver carbonate ($Ag_2CO_3$), silver nitrate ($AgNO_3$), silver chlorate ($AgClO_3$) and silver perchlorate ($AgClO_4$). Suitable copper precursors include, for example, cupric nitrate ($Cu(NO_3)_2$), cupric chloride ($CuCl_2$), cuprous chloride (CuCl) and cupric sulfate ($CuSO_4$). Suitable gold precursors include, for example, gold trichloride ($AuCl_3$) and gold powder. Suitable nickel precursors include, for example, nickel chloride ($NiCl_2$) and nickel nitrate ($Ni(CO_3)_2$), which are soluble in water and alcohol. Suitable palladium precursors include, for example, palladium chloride ($PdCl_2$) and palladium nitrate ($Pd(NO_3)_2$).

The precursors compounds for aerosol delivery are dissolved in a solution generally with a concentration greater than about 0.1 molar. Generally, a greater concentration of precursor in the solution produces a greater throughput of reactant through the reaction chamber. As the concentration increases, however, the solution can become more viscous such that the aerosol may have droplets with larger sizes than desired. Thus, selection of solution concentration can involve a balance of factors in the selection of a particular solution concentration.

For the deposition of elemental metal electrodes, suitable metal precursors are used. Elemental metals are metals in their elemental form, which are not oxidized. Alloys, i.e., metal blends, are considered herein elemental metals if they are unoxidized. Small amounts of impurities or property modifiers, such as carbon, can be included in the elemental metal as long as the resulting composition is metallic, i.e., the material acts like a metal.

For the deposition of barium titanate, the particles are produced with a mixture of barium precursors and titanium precursors to yield the desired stoichiometry of the resultant material. The additional metal oxide components of the dielectric layer are similarly added to the precursor blend to yield the desired amount of property modifier in the dielectric. Alternatively, the property modifiers can be deposited in a separate coating step. In embodiments of particular interest, the dielectric layer includes at least, about 60 weight percent barium titanate, generally at least about 75 weight percent and in many embodiments, at least about 85 weight percent.

If some of the metal of the electrode layer becomes oxidized during the deposition of the dielectric layer, the metal of the electrode layer can be reduced during the sintering step with an atmosphere with a low oxygen partial pressure. Barium titanate is selected such that it is not easy reduced during the sintering step.

Particle Coatings

The basic process for the deposition of particle coatings has been described in detail above. To obtain particular objectives, the features of the coating can be varied with respect to both number and composition of layers of the powders and location of materials on the substrate. To form a chip capacitor, electrodes and dielectric materials must be deposited. In some embodiments there are a plurality of electrodes of each polarity separated by dielectric. In the embodiments of interest, at least one of the materials is deposited by light reactive deposition, although in some embodiments all of the layers are deposited by light reactive deposition.

In a minimal chip capacitor 400, the structure includes only a first electrode 402, a second electrode 404 and a dielectric layer 406 between first electrode 402 and second electrode 404, as shown in FIG. 19. However, to have a higher capacitance, the chip capacitor generally includes a larger number of electrodes, such as up to about 300 layers or more total layers of alternating dielectric and electrodes. When there is a plurality of electrodes of each polarity, the electrodes can be staggered in placement to simplify connection to the electrodes. For example, a cap electrode can be used to connect electrically all of the electrodes of a particular polarity, as shown in FIG. 1. To stagger the placement of the electrodes, only a portion of the surface is covered when an electrode layer is deposited.

While the processing can be performed one chip capacitor at a time, it may be desirable to form a large number of chip capacitor structures simultaneously on a substrate to form a monolithic multi-chip structure that can subsequently be cut to form a large number of chip capacitors. Referring to FIG. 13, substrate 410 is schematically marked to indicate the placement of 25 chip capacitors. Cutting alleys 412 are marked in phantom lines. While the chip capacitors can have a range of shapes, the simplest structures are parallelepiped. The linear dimensions of the chip can range from less than about 0.3 millimeter (mm) to more than about 6 mm, although further reductions in size are contemplated as further miniaturization becomes desirable. Orthogonal dimensions may or may not be equal. Using 1 mm×1 mm as an approximate surface area of a single chip capacitor, an approximately 5×5 cm substrate can be used for the formation of about 2500 chip capacitors simultaneously, although some material will be lost in the cutting alleys.

A substrate generally is selected that can be separated from the multi-chip structure before completing the individual chip capacitors. For example, the substrate can be a polymer film with nonstick characteristics such that the polymer film can be pealed off from the chip materials. Suitable non-stick polymer films include, for example, PET films and polytetrafluoroethylene films.

While some layers can be applied by light reactive deposition and other layer applied with a paste, the layers are applied sequentially by light reactive deposition. One or more passes through the particle stream can be used to form each layer of material. The substrate can be mounted onto a stage of a light reactive deposition apparatus to perform the coating. Generally, the first layer is a dielectric layer to provide a non-conducting surface for the structure. Then, a plurality of electrodes is applied across the surface. Referring to the template shown in FIG. 13, the placement of the plurality of electrodes is guided by the locations of the chips to be cut from the structure. While the deposition process can be designed to partially coat the surface, a mask can be used to deposit the electrode material over only a portion of the surface in stripes. An appropriate mask for a first electrode configuration based on the template of FIG. 13 is shown in FIG. 14. Mask 420 includes stripes 422 that block a portion of the underlying surface. The blocked portion corresponds to a non-overlapping portion of electrodes in adjacent layers. Using mask 420, electrode material is deposited in broad stripes through gaps 424.

Figure 15:
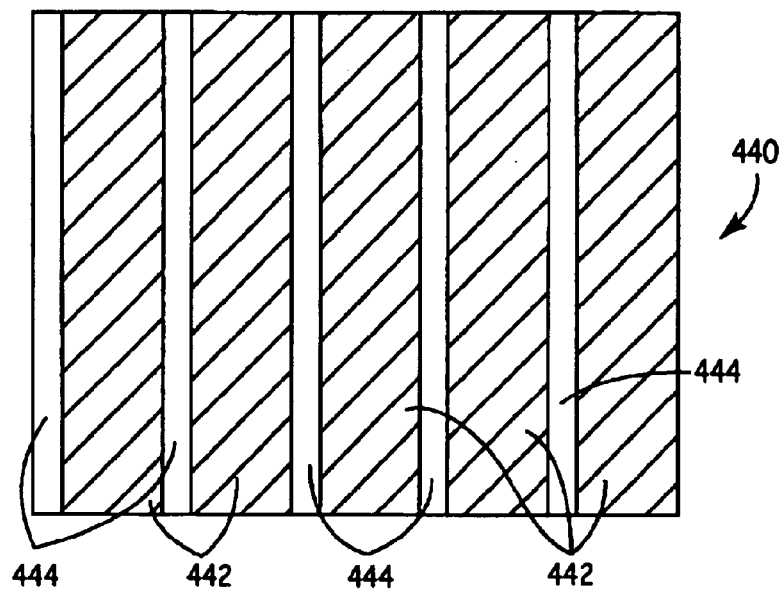
FIG. 15 is a top view of a mask with the inverse structure of the mask of FIG. 14 for the deposition of dielectric material to level the electrode layer formed with the mask of FIG. 14.

After deposition of electrode stripes, another dielectric layer can be deposited over the whole surface. However, thickness discontinuity results from not depositing electrode composition at the blocked portion of mask 420. If the electrode layer is thin enough, this thickness difference may not be significant. Also, this thickness difference can become insignificant due to material compaction during the sintering step. When forming very uniform, smooth coatings, it may be desirable to deposit dielectric through a mask that is the inverse of mask 420 in FIG. 14. Such an inverse mask is shown in FIG. 15. Mask 426 has blocked stripes 428 corresponding to gaps 424 of mask 420 and gaps 430 corresponding to blocked stripes 422. Application of an appropriate thickness of dielectric through mask 426 can compensate for thickness variation due to the structuring of the electrode through mask 420. If dielectric is applied through mask 426, a layer of dielectric subsequently is applied across the entire substrate.

Figure 16:
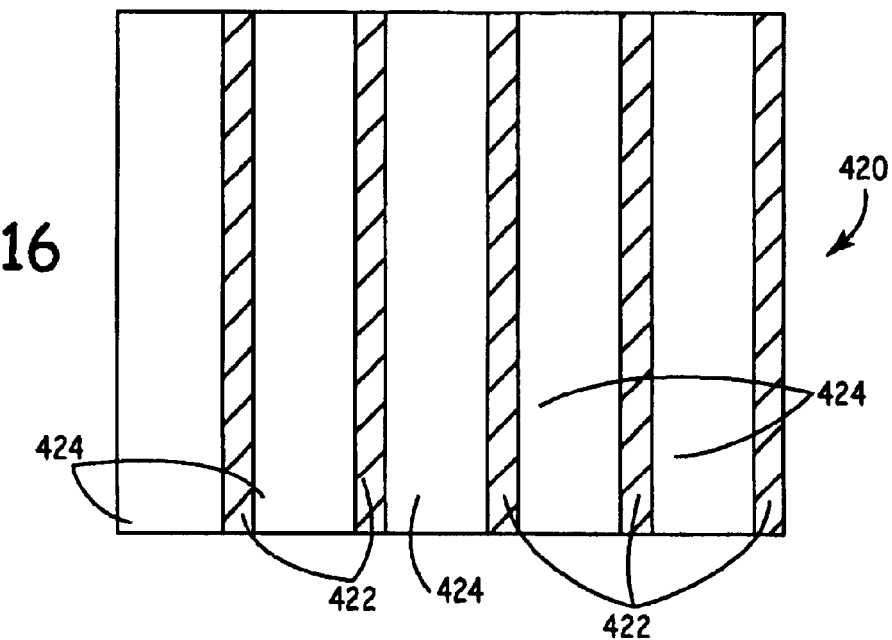
FIG. 16 is a top view of a mask for the formation of a second set of electrodes with opposite polarity from the electrodes formed with the mask of FIG. 14.
Figure 17:
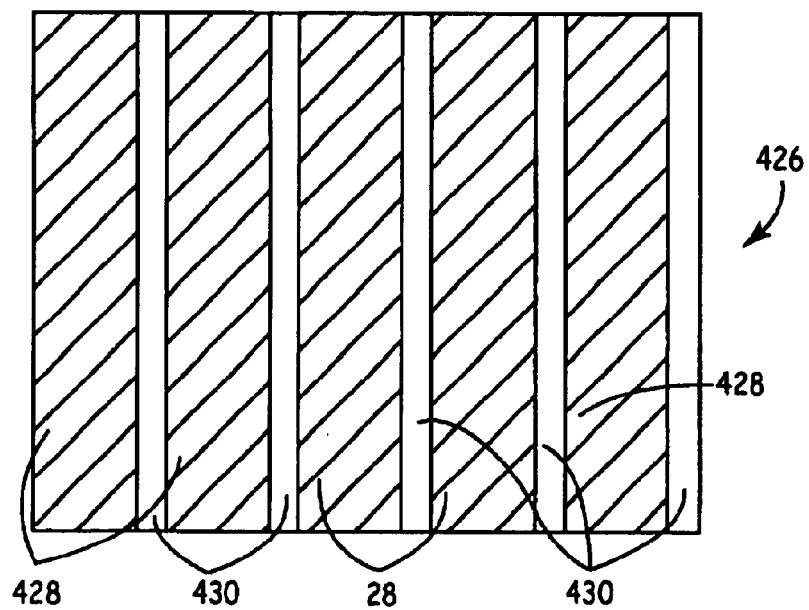
FIG. 17 is a top view of a mask with the inverse structure of the mask of FIG. 16 for the deposition of dielectric material to level the electrode layer formed with the mask of FIG. 16.

Following deposition of a dielectric layer, a second set of electrodes is deposited through a mask 432, shown in FIG. 16. In mask 432, stripes 434 block deposition of electrode material over a portion of the layer. The blocked portion of the substrate corresponds to the opposite edge of a chip capacitor relative to the mask in FIG. 14. Electrode material is deposited through gaps 436. To compensate for discontinuities in thickness, an appropriate thickness of dielectric material can be applied through a mask with an inverse structure to the mask in FIG. 16 for the electrode material. An inverse mask 440 shown in FIG. 17 has stripes 442 that block deposition and gaps 444 that provide for deposition in stripes that were blocked for electrode material deposition. Then, a full dielectric layer is applied.

This process can be repeated to deposit the desired number of electrode layers separated by dielectric layers. Generally, the last layer deposited is a dielectric layer such that the surface is not electrically conductive. This process can be straightforwardly adapted to different configurations of chip capacitors on the substrate. The configuration of FIG. 20 was used for illustrative purposes.

The thickness of the layers can be selected to achieve desired performance levels. In some embodiments, the layers are less than about 5 microns thick and in some embodiments less than about 2 microns thick, following sintering. The use of smaller, highly uniform particles allows for the use of thinner layers with less chance of breaks in the layers that can lead to adverse performance.

Once the monolithic multi-chip structure is complete, the individual chips are cut from the structure. The edges oriented in the direction of the stripes of electrode material are polished to provide a smooth electrode surface for connecting the chip to an end electrode. For efficiency, the polishing can be performed with strips after a first cut along the cut lines oriented top-to-bottom in FIG. 13 before individual chips are cut from the strips.

Sintering is performed to sinter the electrodes into a uniform conductive material. The dielectric material can sinter to the extent that the minor metal oxide dielectric material may or may not fuse with the barium titanate particles to form blended oxides. The sintering is generally performed at a temperature at which the barium titanate itself will not sinter into fused particles. Thus, at the end of the sintering process, the dielectric layer generally is a particular material. The sintering generally is performed at temperatures from about 600° C. to about 1400° C. The sintering atmosphere is generally reducing. For example, a mixture of $N_2$ and $H_2$ can be used. If a precious metal is used in the electrodes, the metal will be less sensitive to the presence of oxygen during the sintering process. The use of smaller metal particles can result in a significant lowering of the sintering temperature of the metal in the electrode layers, such that the sintering temperature can be reduced. Heating can also result in densification of the dielectric layers as the electrode layers sinter.

Another advantage of the light reactive deposition approach over the convention paste deposition approach is the avoidance of the use of a polymer binder. In the conventional approach, a long heating step that can take several hours is used to remove the binder. This heating step to remove binder is not necessary in the light reactive deposition approach, which does not use a binder.

The embodiments above are intended to be illustrative and not limiting. Additional embodiments are within the claims. Although the present invention has been described with reference to preferred embodiments, workers skilled in the art will recognize that changes may be made in form and detail without departing from the spirit and scope of the invention.

What is claimed is:

1. A method for producing ceramic chip capacitors, the method comprising depositing at least two layers of an electrical conductor and at least one layer of a dielectric between the electrical conductor layers, wherein the compositions in the dielectric layer are deposited from a flow in which flowing reactants react to form product particles in a reaction driven by light at a light reaction zone.

2. The method of claim 1 wherein at least four layers of an electrical conductor are deposited and at least three layers of a dielectric are deposited with a dielectric layer disposed between adjacent pairs of electrodes.

3. The method of claim 1 wherein the electrical conductor layers are deposited from a flow in which flowing reactants react to form electrically conductive materials in a reaction driven with light.

4. The method of claim 1 electrical conductor layer comprises elemental metal.

5. The method of claim 1 wherein the dielectric layer comprises $BaTiO_3$.

6. The method of claim 5 wherein the dielectric layer further comprises $MgO$ and $Y_2O_3$.

7. The method of claim 5 wherein the dielectric layer further comprises $MnO$.

8. The method of claim 1 wherein the flowing reactants comprises an aerosol of metal compounds.

9. The method of claim 1 wherein the flowing reactants is generated by a reactant inlet that is elongated in one dimension relative to the orthogonal direction.

10. The method of claim 9 wherein the reactant inlet is elongated at least about a factor of five times the dimension in the orthogonal dimension.

11. The method of claim 9 wherein the deposition is applied to a substrate by scanning the substrate relative to a stream of the product particles from the light reaction zone.

12. The method of claim 11 wherein a linear dimension of the substrate is simultaneously coated with dielectric composition such that the scanning of the substrate relative to the stream of the product particles in one dimension coats all of the desired portion of the substrate.

13. The method of claim 1 wherein the electrical conductor layers are deposited from a flow in which flowing reactants react to form electrically conductive materials in a reaction drive with light and wherein the electrical conductor layers are patterned during deposition to form different structures for opposite electrodes.

14. The method of claim 13 wherein the patterning is accomplished by depositing electrically conductive particles through a mask.

15. The method of claim 13 wherein the patterning is performed by altering the flow from the reactant inlet nozzle.

16. The method of claim 1 further comprising heating the deposited layers to compact the layers and sinter the electrically conductive layers into a uniform material.

17. The method of claim 1 further comprising cutting individual capacitor elements from the deposited layers.

18. The method of claim 17 further comprising smoothing the cut edges of the cut individual capacitor elements and applying cap electrodes.

19. The method of claim 1 wherein the reaction is driven by energy from a light beam.

20. A ceramic chip capacitor having at least two layers of an electrical conductor and at least one layer of a dielectric between the electrical conducting layers, the dielectric layers comprising a collection of particles having an average diameter less than about 90 nm, the collection of particles comprising $BaTiO_3$.

21. The ceramic chip capacitor of claim 20 having at least about four layers of an electrical conductor and at least one dielectric layer between adjacent electrical conductor layers.

22. The ceramic chip capacitor of claim 20 wherein the electrical conductor layers comprise elemental metal.

23. The ceramic chip capacitor of claim 20 wherein the collection of particles have an average diameter less than about 75 nm.

24. The ceramic chip capacitor of claim 20 wherein the collection of particles further comprise Mg and $Y_2O_3$.

25. The ceramic chip capacitor of claim 20 wherein the collection of particles further comprise MnO.

26. The ceramic chip capacitor of claim 20 wherein effectively no particles have an average diameter greater than about three times the average diameter.

27. The ceramic chip capacitor of claim 20 wherein the collection of particles comprises at least about 75 weight percent $BaTiO_3$.

28. A collection of particles comprising barium titanate, the collection of particle having an average diameter less than about 90 nm.

29. The particle collection of claim 28 wherein the collection of particle have an average diameter from about 3 nm to about 75 nm.

30. The particle collection of claim 28 wherein the collection of particle have an average diameter from about 3 nm to about 50 nm.

31. The particle collection of claim 28 wherein effectively no primary particles have an average diameter greater than about 4 times the average diameter.

32. The particle collection of claim 28 wherein effectively no primary particles have an average diameter greater than about 2 times the average diameter.

33. A method for producing barium titanate, the method comprising reacting a flow comprising a barium precursor and a titanium precursor.

34. The method of claim 33 wherein the flow comprises an aerosol.

35. The method of claim 33 wherein the flow comprises barium nitrate ($Ba(NO_3)_2$) or barium chloride ($BaCl_2$).

36. The method of claim 33 wherein the flow comprises titanium dichloride ($TiCl_2$), titanium tetrachloride ($TiCl_4$) or titanium isopropoxide ($Ti[OCH(CH_3)_2]_4$).

37. The method of claim 33 wherein the reaction is driven by a light beam.

* * * * *